US006782884B1

(12) United States Patent
Chen et al.

(10) Patent No.: US 6,782,884 B1
(45) Date of Patent: *Aug. 31, 2004

(54) METHOD AND APPARATUS FOR LOCATING A FAULTY COMPONENT IN A CABLE TELEVISION SYSTEM HAVING CABLE MODEMS

(75) Inventors: Wei-Sing Chen, Fremont, CA (US);
Charles J. Naegeli, Montara, CA (US);
Mark E. Millet, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/431,219

(22) Filed: May 6, 2003

Related U.S. Application Data (63) Continuation of application No. 09/107,837, filed on Jun. 30, 1998, now Pat. No. 6,588,016.

(51) Int. Cl.[7] .......................... H04N 7/173; G06F 11/00
(52) U.S. Cl. .......................... 125/111; 725/107; 714/25; 714/46; 370/242
(58) Field of Search ................................ 725/111, 107; 370/242, 252; 714/25, 46, 47

(56) References Cited

U.S. PATENT DOCUMENTS

| | | | |
|---|---|---|---|
| 4,186,380 A | 1/1980 | Edwin et al. | |
| 5,142,690 A | 8/1992 | McMullan et al. | |
| 5,309,448 A | 5/1994 | Bouloutas et al. | |
| 5,586,121 A | 12/1996 | Moura et al. | |
| 5,606,725 A | 2/1997 | Hart | |
| 5,768,280 A | 6/1998 | Way | |
| 5,768,501 A | 6/1998 | Lewis | |
| 5,777,549 A | 7/1998 | Arrowsmith et al. | |
| 5,790,806 A | 8/1998 | Koperda | |
| 6,070,246 A | 5/2000 | Beser | |
| 6,272,150 B1 | 8/2001 | Hrastar et al. | |
| 6,275,853 B1 | 8/2001 | Beser et al. | |
| 6,307,841 B1 | 10/2001 | Rowles et al. | |
| 6,308,328 B1 | 10/2001 | Bowcutt et al. | |

OTHER PUBLICATIONS

"Data Over Cable Service Interface Specification: Radio Frequency Interface Specification", No. SP–RFI–I05–980724, (1998), pp. 97–115.*

* cited by examiner

Primary Examiner—John Miller
Assistant Examiner—Scott Beliveau
(74) Attorney, Agent, or Firm—Beyer Weaver & Thomas, LLP.

(57) ABSTRACT

A method and system for locating faulty components in a cable modem network configured within a hybrid fiber-coaxial cable television system by tabulating modem performance data are described. A method of isolating problematic components in a cable modem network includes determining whether a cable modem transmitted a polling message to a central destination during the modem's allotted time interval. A media access control layer, located within a cable modem termination system (CMTS), keeps a miss count for the cable modem that reflects the number of times the cable modem does not transmit a polling message to the CMTS during its allotted time. The media access control layer determines whether the cable modem is changing states. This data and the miss count are tabulated in a form that can be analyzed by a correlation module to determine characteristics of the cable television plant. A cable modem entry is inserted into a list of modems experiencing irregular behavior according to the tabulated network topology data relating to the miss count.

28 Claims, 8 Drawing Sheets

METHOD AND APPARATUS FOR LOCATING A FAULTY COMPONENT IN A CABLE TELEVISION SYSTEM HAVING CABLE MODEMS

CROSS-REFERENCES TO RELATED APPLICATIONS

This application is a continuation of U.S. patent application Ser. No. 09/107,837 filed Jun. 30, 1998 in the name of Wei-Sing Chen, Charles J. Naegeli, and Mark E. Millet, and entitled "METHOD AND APPARATUS FOR LOCATING A FAULTY COMPONENT IN A CABLE TELEVISION SYSTEM HAVING CABLE MODEMS. That application is incorporated herein by reference in its entirety and for all purposes.

BACKGROUND OF THE INVENTION

Field of the Invention

1. The present invention relates generally to methods and apparatus for transmitting data in cable television network systems. More specifically, the present invention relates to methods and apparatus for locating problematic devices in a cable television plant.

2. Discussion of Related Art

Since the late 1980's the cable TV industry has been upgrading its signal distribution and transmission infrastructure. In many cable television markets, the infrastructure and topology of cable systems now include fiber optics as part of its signal transmission component. The use of fiber optics has accelerated the pace at which the cable industry has taken advantage of the inherent two-way communication capability of cable systems. The cable industry is now poised to develop reliable and efficient two-way transmission of digital data over its cable lines at speeds orders of magnitude faster than those available through telephone lines, thereby allowing its subscribers to access digital data for uses ranging from Internet access to cable commuting. While cable TV systems have always had the ability to send data downstream, i.e. from a cable TV hub, described below, to cable modems in people's homes, cable TV systems can now send data upstream, i.e. from individual cable modems to a hub. This new upstream data transmission capability enabled cable companies to use set-top cable boxes and provided subscribers with "pay-per-view" functionality, i.e. a service allowing subscribers to send a signal to the cable system indicating that they want to see a certain program.

Figure 1:
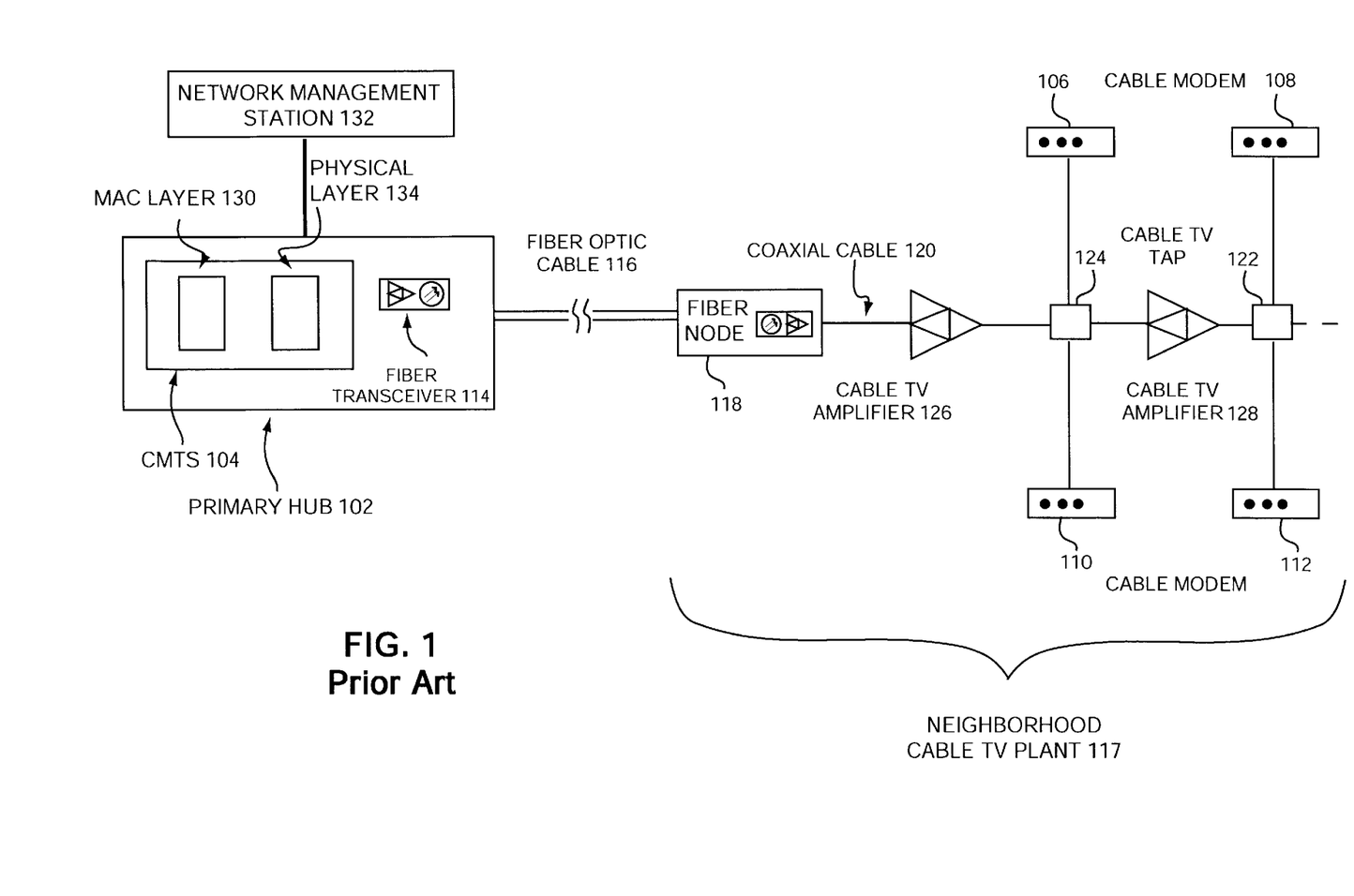
FIG. 1 is a block diagram of a two-way hybrid fiber-coaxial (HFC) cable system including cable modems and a network management station.

FIG. 1 is a block diagram of a two-way hybrid fiber-coaxial (HFC) cable system including cable modems and a network management station. The main distribution component of an HFC cable system is a primary (or secondary) hub 102 which can typically service about 40,000 subscribers or end-users. Hub 102 contains several components of which two, relevant to this discussion, are shown in FIG. 1. One component is a cable modem termination system or, CMTS, 104 needed when transmitting data (sending it downstream to users) and receiving data (receiving upstream data originating from users) using cable modems, shown as boxes 106, 108, 110, and 112. Another component is a fiber transceiver 114 used to convert electrical signals to optical signals for transmission over a fiber optic cable 116. Fiber optic cable 116 can typically run for as long as 100 km and is used to carry data (in one direction) for most of the distance between hub 102 to a neighborhood cable TV plant 117. More specifically, fiber optic cable 116 is a pair of cables—each one carrying data in one direction. When the data reaches a particular neighborhood cable TV plant 117, a fiber node 118 converts the data so that it can be transmitted as electrical signals over a conventional coaxial cable 120, also referred to as a trunk line. Hub 102 can typically support up to 80 fiber nodes and each fiber node can support up to 500 or more subscribers. Thus, there are normally multiple fiber optic cables emanating from hub 102 to an equal number of fiber nodes. In addition, the number of subscribers as well as fiber capacity is currently increasing due to dense wave-division multiplexing technology. DWDM is a technique for transmitting on more than one wavelength of light on the same fiber.

The primary functions of CMTS 104 are (1) interfacing to a two-way data communications network; (2) providing appropriate media access control or MAC level packet headers (described below) for data on the RF interface of a cable system; and (3) modulating and demodulating the data to and from the cable system.

Cable TV (CTV) taps 122 and 124 are used to distribute a data signal to individual cable modems 106 and 110 (from CTV tap 124) and modems 108 and 112 (from CTV tap 122). Two-way cable TV amplifiers 126 and 128 are used to amplify signals as they are carried over coaxial cable 120. Data can be received by the cable modems shown (each CTV tap can have output cables servicing multiple cable modems) and transmitted back to hub 102. In cable systems, digital data is carried over radio frequency (RF) carrier signals. Cable modems are devices that modulate an RF signal to a digital signal and demodulate a digital signal to an RF signal for transmission over a coaxial cable. This modulation/demodulation is done at two points: by a cable modem at the subscriber's home and by CMTS 104 located at hub 102. If CMTS 104 receives digital data, for example from the Internet, it converts the digital data to a modulated RF signal which is carried over the fiber and coaxial lines to the subscriber premises. A cable modem then demodulates the RF signal and feeds the digital data to a computer (not shown). On the return path, the operations are reversed. The digital data is fed to the cable modem which converts it to a modulated RF signal. Once CMTS 104 receives the RF signal, it demodulates it and transmits the digital data to an external source.

Data packets are addressed to specific modems or to a hub (if sent upstream) by a MAC layer 130 in CMTS 104 at hub 102 (there is also a MAC addressing component, not shown, in the cable modems that encapsulate data with a header containing the address of the hub when data is being sent upstream). CMTS 104 has a physical layer 134 that is responsible for keeping a list of modem addresses and encapsulating data with appropriate address of its destination. MAC layer 130 receives data packets from a Data Network Interface (not shown) in hub 102. The main purpose of MAC layer 130 is to encapsulate a data packet within a MAC header according to the DOCSIS standard for transmission of data. This standard is currently a draft recommendation (J.isc Annex B) which has been publicly presented to Study Group 9 of the ITU in October 1997, and is known to a person in the cable modem data communication field. MAC layer 130 contains the necessary logic to encapsulate data with the appropriate MAC addresses of the cable modems on the system. Each cable modem on the system has its own MAC address. Whenever a new cable modem is installed, its address must be registered with MAC layer 130. The MAC address is necessary to distinguish data going from the cable modems since all modems share a common upstream path, and so that CMTS 104 knows where to send data. Thus, data packets, regardless of format, must be mapped to a particular MAC address. MAC layer 130 is also responsible for sending out polling messages as part of the link protocol between the CMTS and the cable modems that is necessary to maintain a communication connection between the two.

As mentioned earlier, cable modems can be used to not only receive cable television signals but also digital data and, thus, can provide high-speed access to Internet data or to data from remote computer networks. Because of the increasing usefulness of cable modems for transmitting data over existing cable TV systems, cable modems are proliferating. As they become more prevalent, the burden of maintaining a cable TV plant having a network of cable modems increases. Specifically, the problem of tracking down and isolating a problematic device or group of devices has become increasingly difficult. In response to the increasing need to manage the growing network of cable modems, network management stations are now part of the cable TV system. As shown in FIG. 1, a network management station (NMS) 132 is connected to hub 102, and more specifically to CMTS 104. NMS 132 is located generally at a network operation center, or NOC (not shown in FIG. 1), NMS 132 monitors the CMTS and cable modems using a data communication protocol such as SNMP (Simple Network Management Protocol) and alerts an operator in the event of a failure.

The communication link between the network management station 132 and CMTS 104 has been mostly one-way: commands going from management station 132 to CMTS 104. When a cable modem user is experiencing a problem with a cable modem while, for example, accessing the Internet, the user typically first calls its Internet service provider (ISP). The ISP then calls the cable operator, also referred to as a multiple service operator (MSO), informing it that a particular cable modem is not working. An MSO operator then goes out to the physical site and conducts tests. Often the problem goes away or the problem device cannot be isolated. The MSO then informs the ISO that it could not find anything wrong. This can go on for a while until the MSO can finally locate the problem, which could range from a faulty modem or a bad amplifier along the trunk line. In any event, monitoring of all the cable modems in a given region can quickly become a heavy and unmanageable burden on the NOC, especially as the use of cable modems grows. It can also create dissatisfaction and a sense of unreliability among cable modem users stemming from cable modem plant repair being slow, costly, and inconvenient, e.g. the MSO having to make multiple trips to eventually isolate the problem, sometimes taking up to 10–12 man hours and several interruptions in service.

Therefore, it would be desirable to be able to identify problematic or faulty components in an HFC cable TV system having cable modems supporting two-way transmission of data by using performance data with topological attributes. It would also be desirable to shift the cable plant monitoring task from the network management station to the CMTS, thereby automating the task while not adding to network management traffic by generating any additional messages used solely for testing purposes.

SUMMARY OF THE INVENTION

To achieve the foregoing, and in accordance with the purpose of the present invention, methods, systems, and computer-readable media for locating faulty components in a cable modem network configured within a hybrid fiber-coaxial cable television plant are described. In one embodiment of one aspect of the invention, a method of isolating problematic components in a cable modem network includes determining whether a cable modem transmitted a polling message to a central destination during an allotted time interval. A miss count for the cable modem is created reflecting the number of times the cable modem does not transmit a polling message to the central repository during its allotted time. The cable modem can be in one of several states where each state represents a condition of the cable modem. It is then determined whether the cable modem is changing states. This data and the miss count is tabulated in a form that can be analyzed to determine characteristics of the cable television plant. A cable modem entry is inserted into a list of modems experiencing irregular behavior according to the tabulated data relating to the miss count and cable modem state changes.

In another embodiment, the cable modem is informed of a time interval in which the modem can transmit a polling message to the central destination, such as a cable modem termination system. In another embodiment, a cable modem can be in either a hit state, a miss state, or an initial start-up state. In yet another embodiment, the central destination is informed that the cable modem is activated and desires a time interval in which it can transmit a polling message to the central destination. In yet another embodiment a miss count is created by detecting when the cable modem does not transmit a polling message to the central destination during its assigned time interval and counting the number of times the cable modem does not do so. The miss count is reset to zero whenever the cable modem transmits a polling message to the central repository during an assigned time interval.

In another embodiment, a hit count for the cable modem is created reflecting the number of times a polling message is transmitted to the central repository. In yet another embodiment, the cable modem is disconnected from the central destination after a predetermined number of consecutive miss states. The number of times a cable modem changes states and the frequency of the cable modem misses are tabulated and processed through a path analyzing module to locate a faulty component.

In another aspect of the invention, a system for locating faults in a cable television plant having cable modems is described. The system includes a network management console having a fault information processing component. The console conveys fault information in the cable television plant using the fault information processing component. A cable modem termination system having a media access control (MAC) component, prepares data for transmission in the cable television plant and monitors and tabulates fault data related to the cable modems. A memory storage contains data on the cable modems in the form of lists and tables. The cable modems are part of a network of cable modems capable of receiving data from and sending data to the cable modem termination system.

In one embodiment, the network management console has a path analyzing module and a display monitor for displaying output from the module. In yet another embodiment, the MAC component has several state machines for detecting transitions of a cable modem. One of the state machines detects whether a cable modem is in an initial maintenance state. Another state machine detects whether a cable modem has transmitted a polling message to the cable modem termination system during an assigned time interval. In yet another embodiment, the MAC component contains a message processing module that sends maintenance messages to the cable modems and receives polling messages from the cable modems. In yet another embodiment, the memory storage contains a flapping modem list with entries for each modem seen as behaving irregularly and a cable modem table having an entry for each modem in the network. Each entry in the flapping modem list references an entry in the cable modem table.

In another aspect of the invention, a fault locator for use in a cable television plant having a network of cable modems is described. A message processing module send and receives polling messages relating to the network of cable modems. A flapping modem detector checks whether a cable modem changes states more frequently than an acceptable frequency level. If so, the modem is placed in a flapping modem list that stores information relating to the network of cable modems.

In another embodiment, a network management console for correlating fault information and displaying the fault information to a user is connected to the fault locator. In another embodiment, the message processing module sends initial maintenance messages to the cable modems and receives polling messages from the cable modems. In yet another embodiment, the flapping modem detector includes an initial maintenance state machine for detecting when a cable modem has entered an initial maintenance state and a hit/miss state machine for detecting whether a cable modem has transmitted a polling message during an allotted time.

In another aspect of the present invention, a computer-readable medium containing programming instructions for formatting a cable modem list used in a cable modem network fault detection system and having several cable modem entries is described. Each cable modem entry has at least a modem identifier field, one or more polling response fields, and one or more modem state transition fields. The modem identifier field contains a unique identifier for the modem, such as the modem MAC address. The polling response field stores information relating to how often a modem transmits a polling response to a cable modem termination system. The modem state transition field stores information on state transitions of a cable modem.

In one embodiment, one of the polling response fields stores the number of hits made by the modem, a hit indicating that the modem transmitted a polling message during its allotted time interval. In another embodiment, one of the polling response fields stores the number of misses by the modem, a miss indicating that the modem did not transmit a polling message during its allotted time interval. In yet another embodiment, one of the state transition fields stores a count of the number of times a modem transitions into an initial maintenance state. Another one of the state transition fields stores the last time and day a modem changed states.

BRIEF DESCRIPTION OF THE DRAWINGS

The invention, together with further advantages thereof, may best be understood by reference of he following description taken in conjunction with the accompanying drawings in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A method and system of detecting problematic devices in a cable TV plant using cable modems for two-way data transmission is described in the various drawings. Cable modems are linked or connected to a cable modem termination system (CMTS) housed in a primary or secondary hub through coaxial and fiber optic cables. There is also a communication link protocol that maintains the connections and ensures that the link between a cable modem and the CMTS is up. More specifically, the MAC controller layer in the CMTS communicates with the MAC controller layer in the cable modem.

Part of the communication link protocol is polling messages exchanged between cable modems and a CMTS. Polling messages behave as heartbeats from cable modems telling a CMTS that the cable modem is still enabled or alive. A CMTS instructs all cable modems it supports when to send it a polling message. That is, each cable modem is given a window of time within which it should send a polling message upstream to the CMTS. During that time frame, the CMTS expects to receive a message from a particular cable modem. If the CMTS does not receive a polling message from a cable modem for a threshold number of consecutive time frames in which that cable modem should have sent a polling message, the CMTS assumes the connection between the cable modem and CMTS is lost.

The present invention involves tabulating state transitions of many cable modems and comparing the tabulated data over a time threshold to see if cable modems are transitioning states more often than expected (e.g., once every ten minutes or so at the same time everyday). The tabulated data is referred to as a state transition log. The state transition log contains event data acquired from many cable modems over time. Certain patterns, called signatures, in the event data are used to detect flapping modems. A flapping modem is a modem with a communications link transitioning between the link up and link down states in an abnormal, periodic, or intermittent pattern. The tabulation and maintenance polling detection process of a preferred embodiment of the present invention resides is implemented in the CMTS of a CATV hub, and is implemented in a MAC device.

Figure 2A:
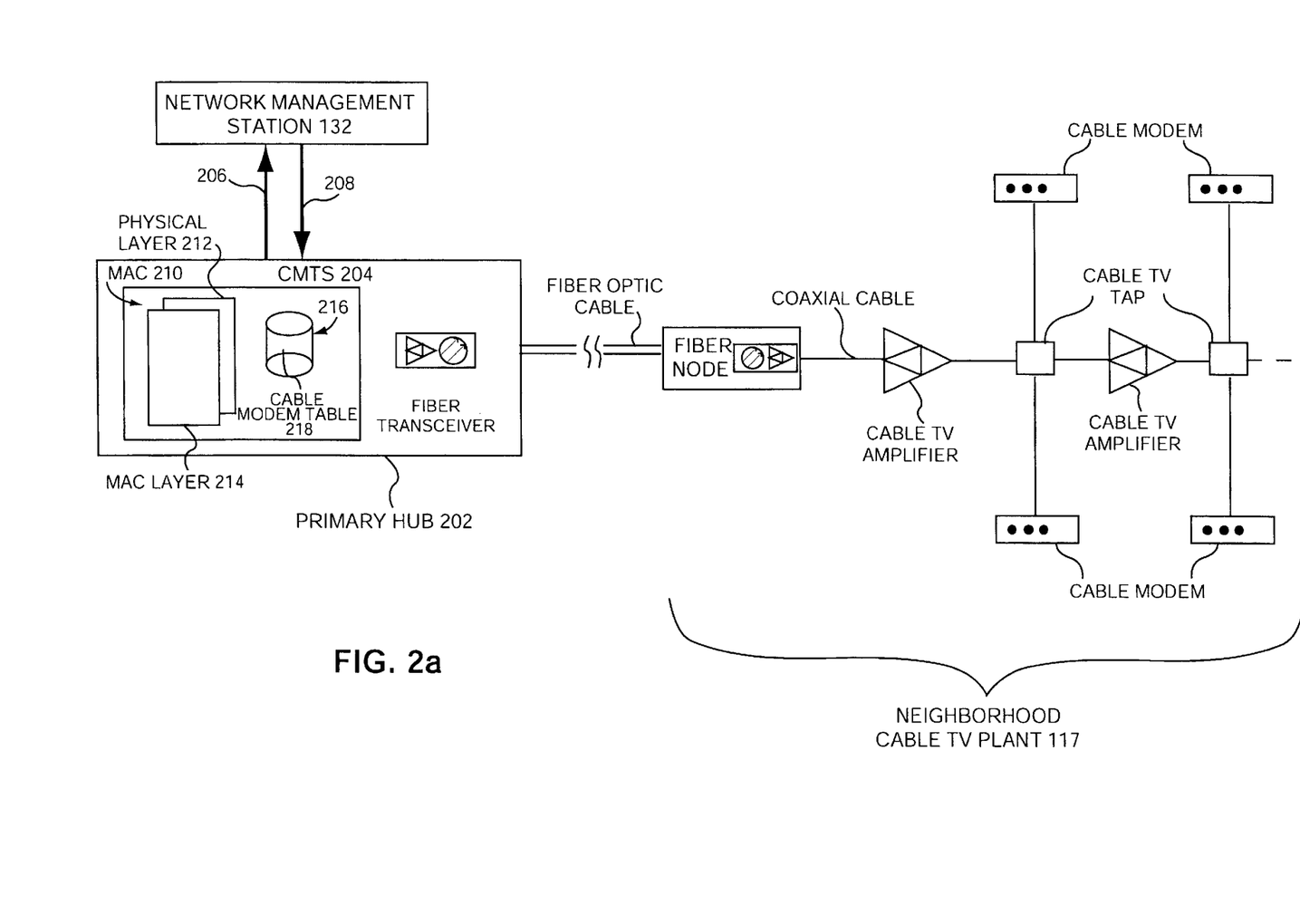
FIG. 2a is a block diagram of components in an HFC cable TV system in accordance with a preferred embodiment of the present invention.

FIG. 2a is a block diagram of components in an HFC cable TV system in accordance with a preferred embodiment of the present invention. Many of the components shown in FIG. 2a are the same as those in FIG. 1. In a preferred embodiment, all the components in neighborhood cable TV plant 117 are the same. These components include cable modems, CATV taps, CATV amplifiers, and fiber nodes. Within the CATV hub is a CMTS and fiber transceiver, among other components well known in the art. Emanating from the hub are a series of fiber optic cables, of which one pair is shown in FIG. 2a, connected to a fiber node. As mentioned earlier, a hub can support typically up to 80 fiber nodes. A fiber node converts the optical signal to an electrical signal for transmission over a coaxial cable to CTV taps for distribution to individual cable modems.

Also shown in FIG. 2a is a network management station 132 connected to a hub 202 or, more specifically, a CMTS 204. The connection is represented by two oppositely pointing arrows 206 and 208 indicating that data flows in both directions, as explained in greater detail below, as opposed to primarily in one direction (from the management station to CMTS) as shown with respect to FIG. 1. In a preferred embodiment, the tabulation and maintenance process, referred to as a station maintenance polling technique, is implemented primarily in CMTS 204 and network management station 132. The present invention enables monitoring of the cable modem network implemented on a cable TV system without adding any extra components or overhead to the system. Thus, in a preferred embodiment, neighborhood cable TV plant 117 is unchanged.

CMTS 204 includes a MAC component 210 which encapsulates data packets with a MAC header containing a destination address of a cable modem. One component of CMTS 204 is a physical layer 212 to maintain a communication link between CMTS 204 and all the cable modems it supports. As explained above, it does this by receiving polling messages from cable modems at predetermined times. In a preferred embodiment of the present invention, a MAC layer 214 is added on top of physical layer 212. MAC layer 214 implements the station maintenance polling and tabulates the topological performance data needed to monitor the network of cable modems. Also included in CMTS is a memory storage area 216 that stores a cable modem table 218, described below. Also stored in storage 216 is a flapping modem list (not shown) and also described below. In a preferred embodiment, cable modem table 218 and flapping modem list accessible by the station maintenance polling program and the network operation center (NOC) at network management station.

Figure 2B:
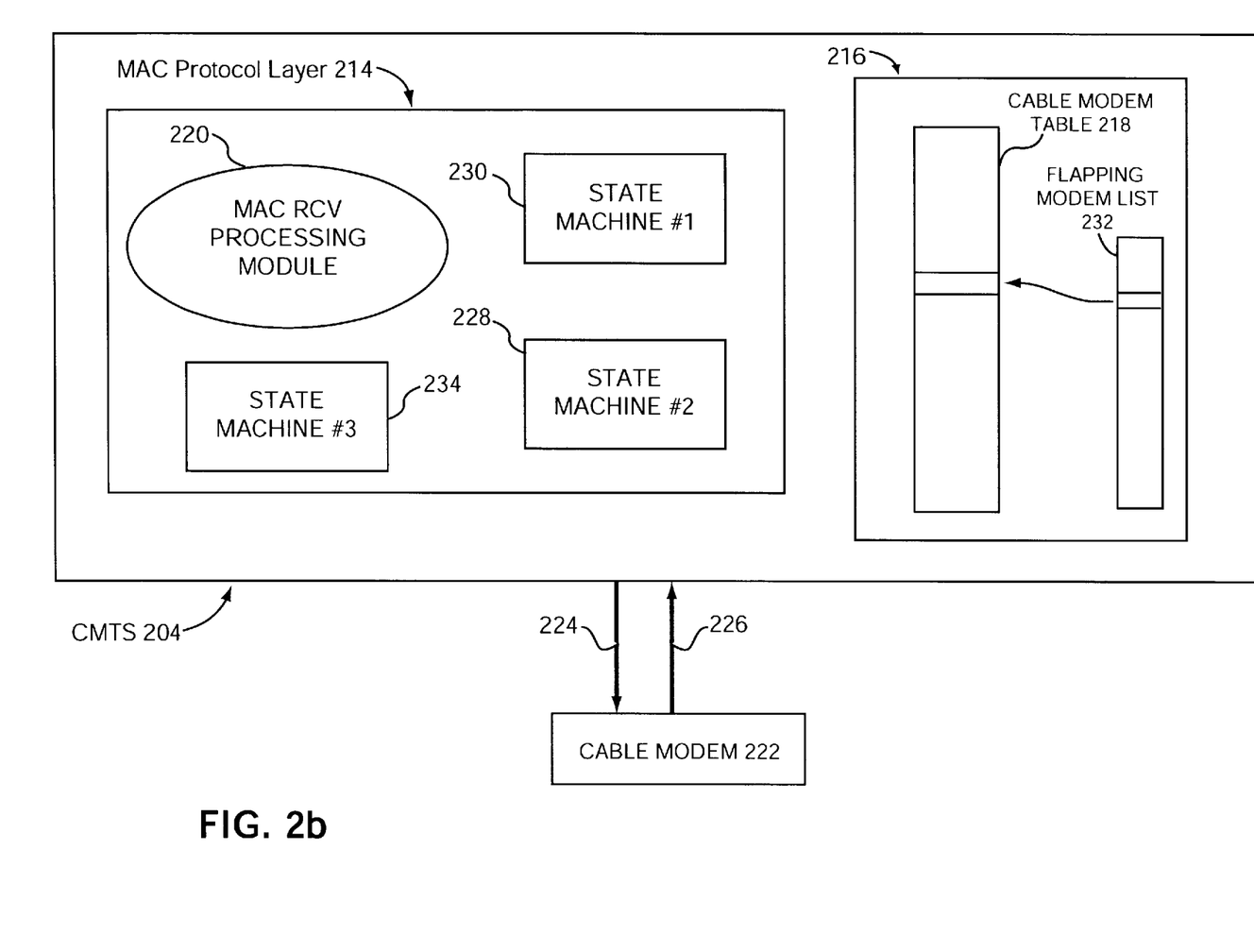
FIG. 2b is a block diagram showing in greater detail a CMTS containing a flapping signal detection mechanism in accordance with a preferred embodiment of the present invention.

FIG. 2b is a block diagram showing in greater detail CMTS 204 containing a flapping signal detection mechanism in accordance with a preferred embodiment of the present invention. It shows in greater detail MAC layer 214 of FIG. 2a. In a preferred embodiment, a processing module referred to as a MAC RCV processing module 220 of MAC layer 214 has a variety of functions. In a preferred embodiment one of its functions is to transmit time interval type messages to cable modems, one of which is shown as modem 222 and is shown as connected to the CMTS for purposes of discussion. One type of message sent out by MAC RCV processing module 220 is an initial maintenance message. This message informs all modems that if a modem wants to come online and have an entry in cable modem table 218, it should send an initial maintenance request during the time interval specified in the initial maintenance message. This, as well as the other messages introduced here, are described in greater detail with respect to the FIGS. 3 to 7 below. MAC RCV processing module 220 also sends out a station maintenance message to those modems that are online indicating to each modem a time interval in which a modem should send to the CMTS a polling message to indicate to the CMTS that the connection to the cable modem is still good. In a preferred embodiment a polling message is sent from cable modem 222 to CMTS 204, and specifically the MAC RCV module 220, in the form of a range request message. This is the same type of message that a cable modem sends to a CMTS (during a time interval specified in an initial maintenance message) requesting to be assigned a time interval in which it should send a polling message.

Figure 4A:
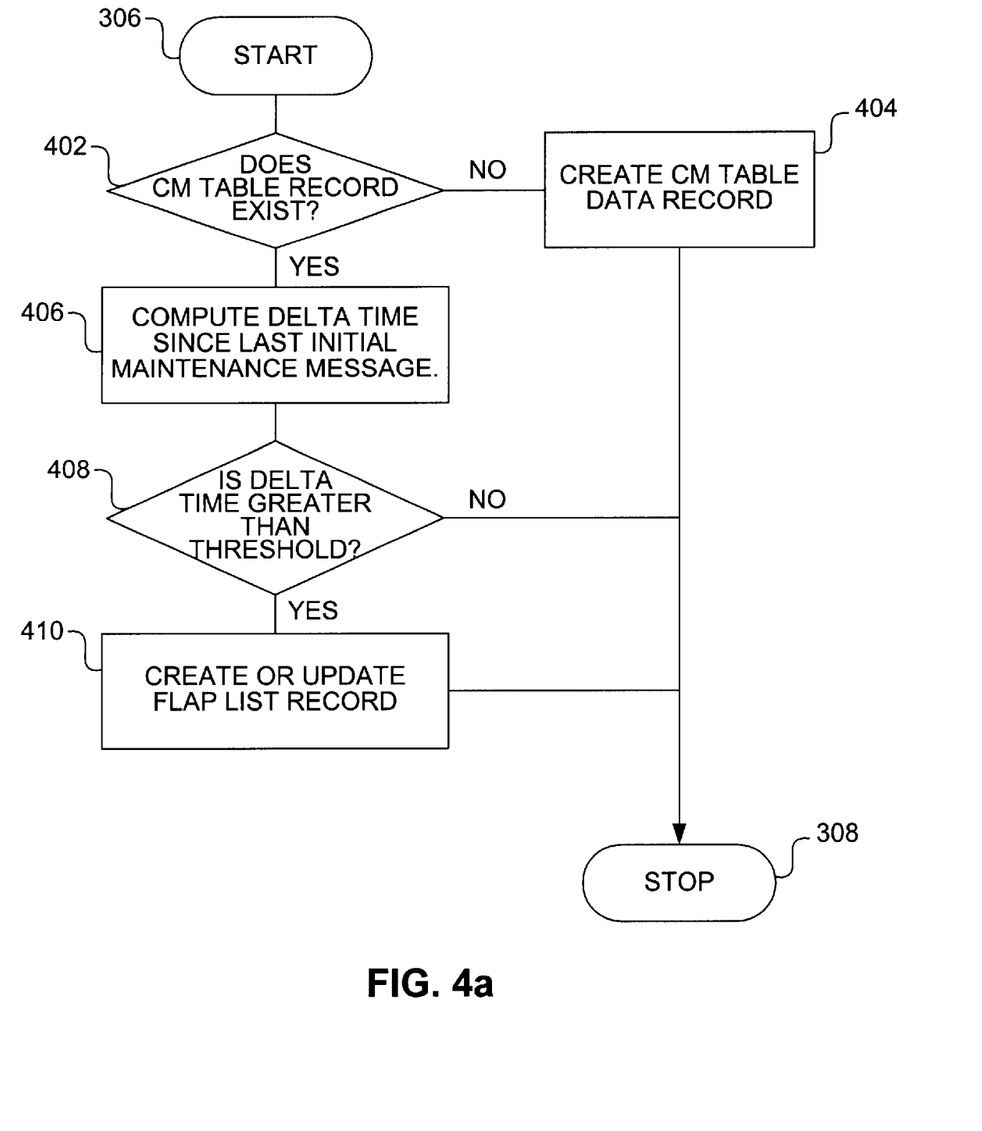
FIG. 4a is a flow diagram of an initial maintenance flap detector state machine in accordance with a preferred embodiment of the present invention.

A sequence of messages between MAC layer 214 of CMTS 204 and a cable modem are shown by arrows 224 and 226. Arrow 224 shows an initial maintenance message sent from CMTS 204 to all cable modems, including modem 222. When modem 222 is powered up, it sends a range request message to CMTS 204 during the initial maintenance time interval shown by arrow 226. CMTS 204 then sends modem 222 a station maintenance message assigning cable modem 222 a time interval in which it can send future range request messages to indicate that its communication connection to the CMTS is still good. Modem 222 is expected to continue sending range request messages to CMTS 204 while it is online. When it does so, it is referred to as a hit, described in greater detail below, and is detected by a state machine 228, described in greater detail with respect to FIG. 4b, and part of flapping modem detection mechanism and another component of MAC layer 214. When a cable modem does not transmit a range request to a CMTS it is referred to as a miss and is also detected by state machine 228. State machine 230, described in greater detail with respect to FIG. 4a, is used to detect initial maintenance requests from CMTS 204 and is another component of MAC layer 214. State machine 234, described in greater detail with respect to FIG. 4c, is used to adjust an absolute value of power adjustment. In a preferred embodiment, CMTS 204 also contains cable modem table 218 and a flapping modem list 232. Briefly, cable modem table 218 contains entries on each modem having a live communication connection with CMTS 204 and is used to store statistics on hits and misses for each modem, along with other data. A detailed diagram showing sample cable modem entries is shown in FIG. 7. Flapping modem list 232 contains an entry for each modem for which a flap signal has been detected. Each entry has a pointer, such as the modem's MAC address, to a corresponding entry in cable modem list 218. Thus, in a preferred embodiment, information on a flapping modem is not repeated for a second time in flapping modem list 232. These items are described in greater detail below.

Figure 3:
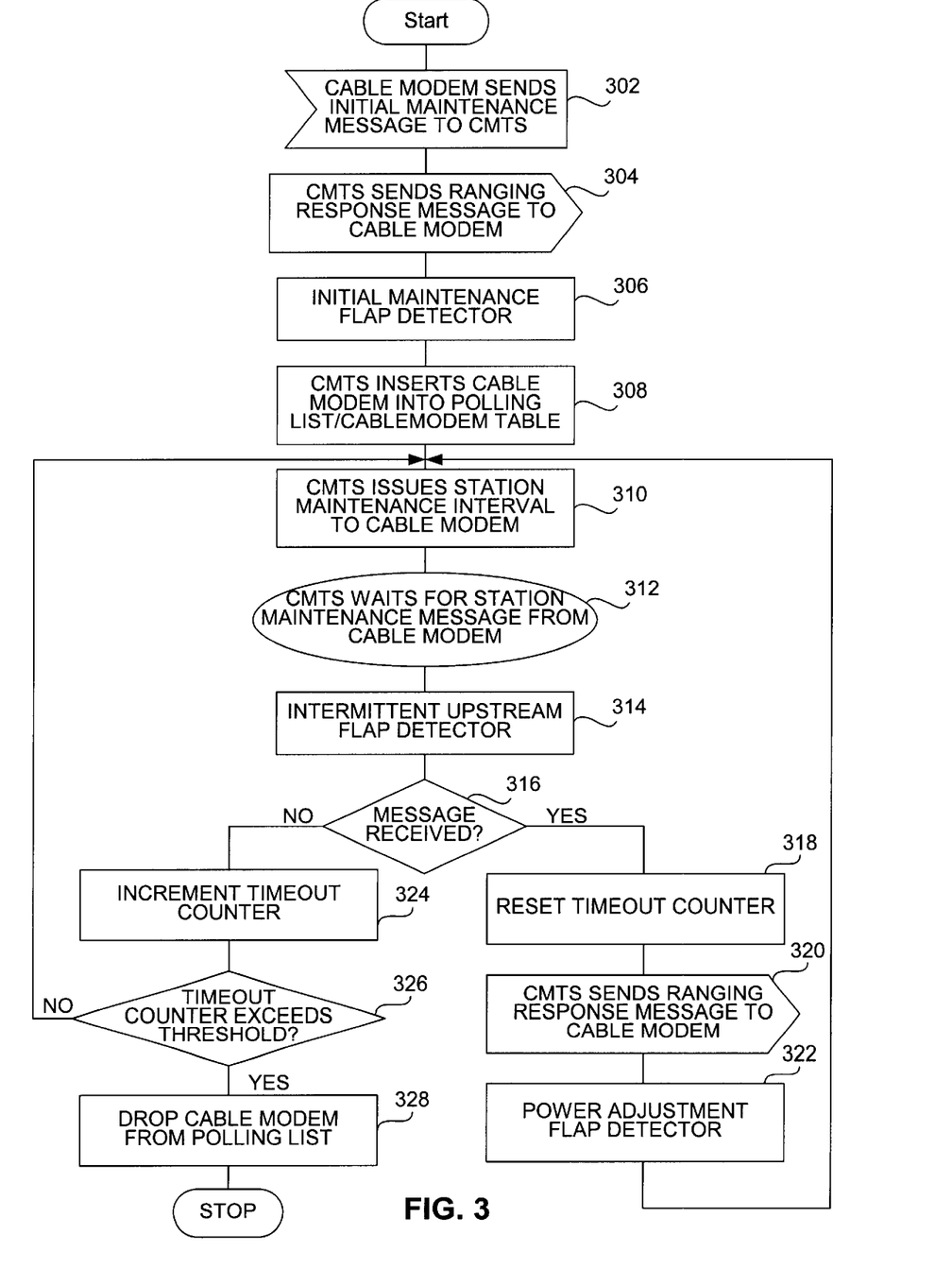
FIG. 3 is a flow diagram of a process for cable modem link maintenance processing in accordance with a preferred embodiment of the present invention.

FIG. 3 is a flow diagram of a process for cable modem link maintenance processing in accordance with a preferred embodiment of the present invention. At a step 302 the cable modem sends an initial maintenance message to the CMTS indicating to the CMTS that it wants to be inserted into a polling list and be issued a time interval in which to send a polling message to the CMTS. At a step 304 the CMTS sends a ranging response message, also referred to as a station maintenance message, to the cable modem. The ranging response message from the CMTS to the cable modem acknowledges receipt of the initial or station maintenance message and informs the cable modem to perform timing, power, and frequency adjustments to its transmitter. At a step 306 an initial maintenance cable modem flap detector is activated. The purpose of the detector is to identify modems sending initial maintenance too frequently. A state machine for initial maintenance flap detection is described in FIG. 4a. At a step 308 the CMTS inserts a cable modem data record corresponding to the cable modem into a polling list/cable modem table. In the described embodiment, the entry is a unique data record using the cable modem MAC address as a retrieval key. In other preferred embodiments, other content of the data record can be used as a retrieval key. A cable modem table and fields in a typical data record belonging to a particular cable modem are described in greater detail with respect to FIG. 5. Thus, at step 308 the CMTS inserts the data record having several variables discussed below relating to the initial maintenance flap detector state machine into the polling list.

Once the cable modem is inserted into a polling list/cable modem table, at a step 310 the CMTS issues a station maintenance interval message to the cable modem. The CMTS issues a type of broadcast message to all cable modems in its polling list informing each cable modem of when it is expected to send a polling message to the CMTS. At a step 312 the CMTS waits for a station maintenance message from the cable modem. In the described embodiments, it expects to receive this message from each cable modem within a certain time interval or slot, typically in the resolution of microseconds, to indicate that the cable modem is still online. This method of transmitting responses is referred to as time division multiple access (TDMA) and prevents the upstream transmission from colliding with upstream transmissions of other cable modems. At a step 314 an intermittent upstream flap detector is activated. The purpose of the intermittent upstream flap detector is to identify upstream impairment events which are a function of time and network topology. A state machine for the intermittent upstream flap detector is described in greater detail in FIG. 4b.

At a step 316 the CMTS determines whether a station maintenance message was received from the cable modem during its assigned time slot. If a message was received, control goes to a step 318 where a time-out counter is reset to zero. Each cable modem has an associated time-out counter. It is a variable that is incremented every time the CMTS does not receive a polling message, i.e., there is a miss (described below with respect to step 324) from the cable modem. The variable is reset to zero (or kept at zero) every time the CMTS receives a polling message, i.e., there is a hit. At a step 320 the CMTS sends a ranging response message to the cable modem. This is the same type of message sent to the cable modem at step 304. At a step 322 a power adjustment flap detector is activated. The purpose of the power adjustment flap detector is to identify upstream power adjustment events which are a function of time and topology. A state machine for the power adjustment flap detection is described with respect to FIG. 4c. Control then returns to step 310 where the CMTS issues another message containing a station maintenance interval to the cable modem and the cable modem link maintenance processing continues normal operation.

Returning to step 316, if the CMTS does not receive a station maintenance message from the cable modem, control goes to a step 324 where the timeout counter described with respect to step 318 is incremented, i.e., there is a miss. At a step 326 it is determined whether the time-out counter has exceeded a threshold (e.g. 16 consecutive misses, or other appropriate number) Because of step 318, where the time-out counter is reset to zero whenever there is a hit, there have to be consecutive misses to exceed the threshold value. If the threshold value has not been reached, control returns to step 310 where the CMTS issues another station maintenance interval message to the cable modem, and the polling process continues. If the threshold value has been reached, the cable modem is dropped from the polling list at a step 328. According to the DOCSIS RF protocol, the link between the CMTS and cable modem is considered terminated in a normal way.

At step 328 the CMTS assumes that the cable modem has gone off-line or experienced some type of failure. At this stage, the cable modem can be brought back online by powering up the cable modem and beginning again with step 302. If the modem is dropped from the list and brought back online shortly thereafter, such as within a few minutes, there is very likely a problem with that modem, since the modem was probably not turned off intentionally by the subscriber. If there are other modems in its vicinity experiencing the same problem, there is probably a faulty component in a common path leading to those modems. If only one or two adjacent neighboring modems are problematic, then the problem probably lies in the cable section between the closest CATV tap and the problematic modems. In any event, this information is provided to the network operation center which can then use correlation programs to pinpoint or greatly narrow the area where the problem lies.

Figure 4B:
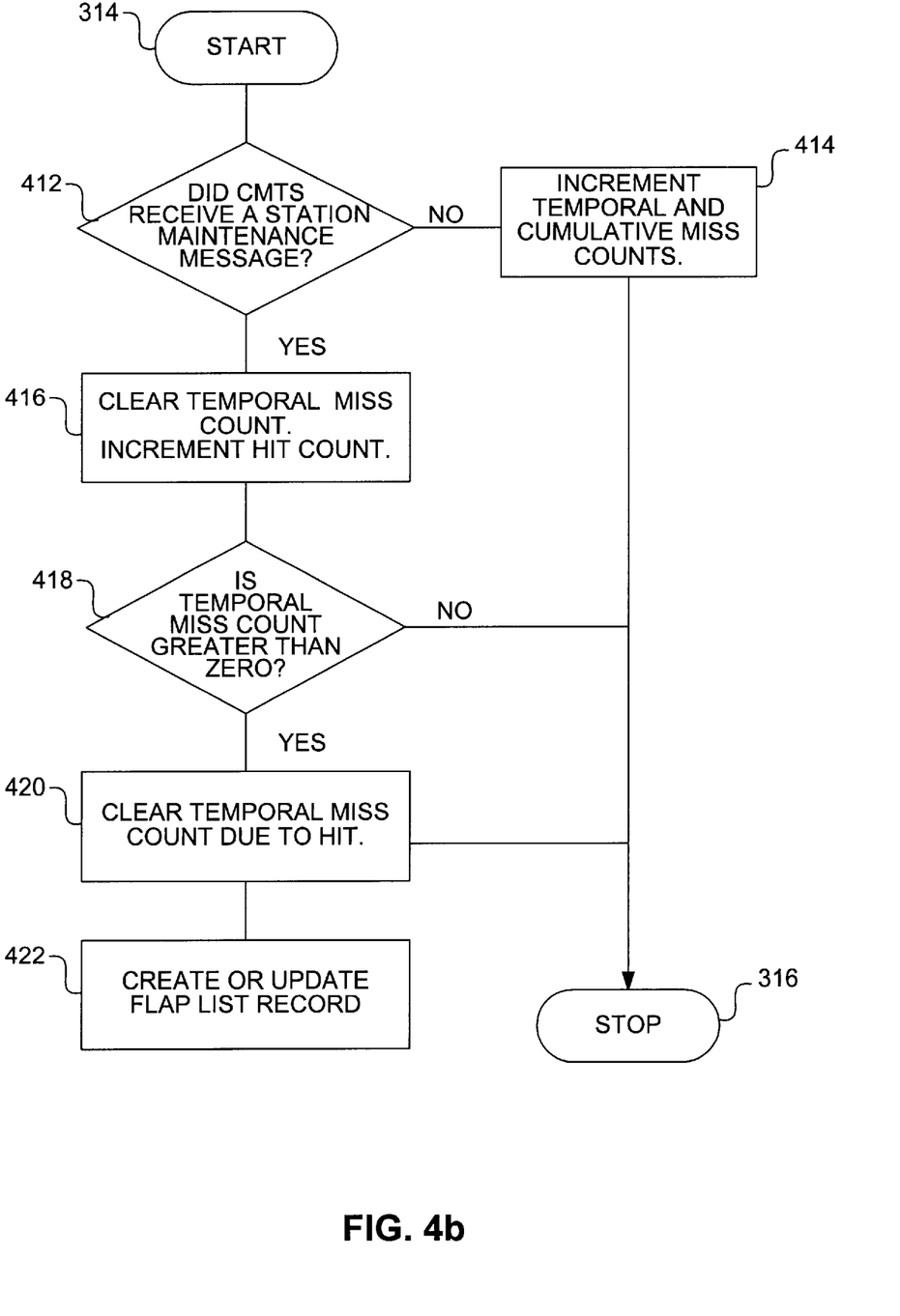
FIG. 4b is a flow diagram of an intermittent upstream flap detector in accordance with a preferred embodiment of the present invention.
Figure 4C:
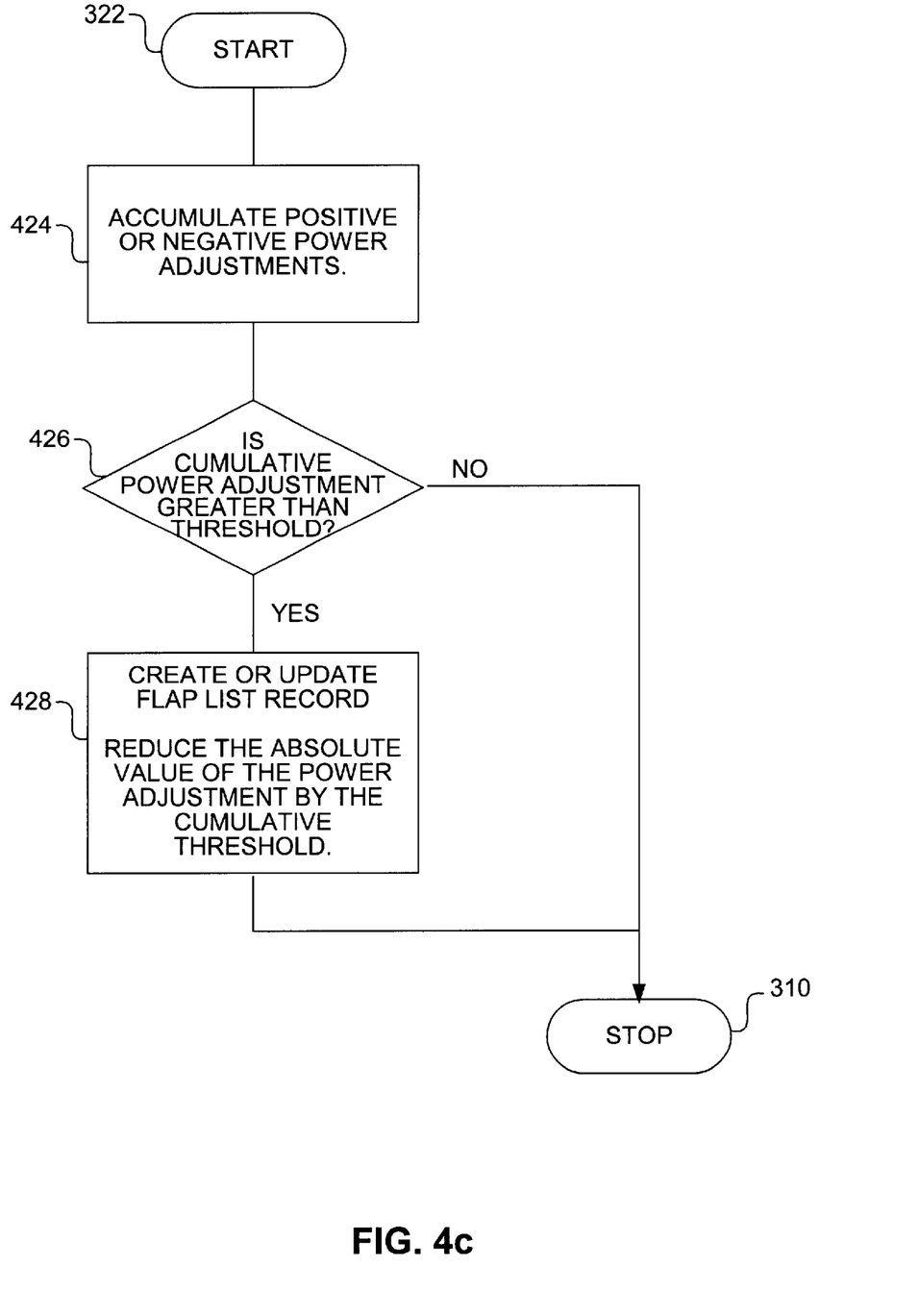
FIG. 4c is a flow diagram of a power adjustment flap detector state machine in accordance with a preferred embodiment of the present invention.

FIGS. 4a, 4b, and 4c are state machine diagrams showing in greater detail steps 306, 314, and 322, respectively, of FIG. 3, in accordance with a preferred embodiment of the present invention. FIG. 4a is a flow diagram of an initial maintenance flap detector state machine as presented in the described embodiment. As shown initially at step 306 of FIG. 3, the CMTS receives an initial maintenance message from the cable modem. At a step 402 the CMTS determines whether a data record for the cable modem exists in the cable modem table. This is done by searching the cable modem table 218 shown in FIG. 2. If a cable modem table data record does not exist for the cable modem, one is created for the modem at a step 404. The various fields of a typical data record are shown in greater detail with respect to FIG. 5. At step 404, certain fields in the data record are set or initialized. For the purposes of clarity, these values are described in the discussion below with respect to FIG. 5. Once the data record is created, control returns to step 308 where the CMTS inserts the cable modem data record into the polling list/cable modem table.

Returning to step 402 of FIG. 4a, if a data record for the cable modem already exists, the CMTS determines a time delta using data in the cable modem table record at a step 406. The delta represents the time since the last initial maintenance message. In addition, the number of times an initial maintenance message was received by the CMTS is incremented by one. At a step 408, the CMTS determines whether the time delta calculated in step 406 is greater than an initial maintenance flap threshold. A typical threshold value is five minutes. It is an amount of time within which a subscriber is unlikely to restart the cable modem. If the cable modem is restarted within this time interval, the subscriber is likely experiencing a problem with the cable modem. If it is not, control goes to step 308 of FIG. 3. At a step 410, the CMTS either creates or updates a data record contained in a flap list 232 as shown in FIG. 2b. In the described embodiment, this involves setting the time the modem flap list record was created or the last time it was updated to the current time, and incrementing the number of times the flap list record was updated by one (or setting it to one if being created for first time). Once the flap list record has been created or updated, the maintenance polling process continues with step 308 of FIG. 3.

FIG. 4b is a flow diagram of an intermittent upstream flap detector in accordance with a preferred embodiment of the present invention. It shows in greater detail step 314 of FIG. 3. At a step 412 the CMTS determines whether a station maintenance message was received. If a message was not received, control goes to step 414 where the cable modem list data record is updated. Here the number of times the CMTS expected, but did not receive, a station maintenance message from the cable modem since the last time the CMTS did receive a station maintenance message from the cable modem is incremented. This number is essentially a temporal miss count corresponding to the cable modem. In addition, at step 414 the number of times the CMTS expected but did not receive a station maintenance message from the cable modem. This number is essentially a cumulative miss count corresponding to the cable modem. This count is initialized by the Initial Maintenance Flap Detector State Machine described with respect to FIG. 4a.

If the CMTS did receive a station maintenance message, control goes to a step 416. In the described embodiment, at step 416 the number of times the CMTS expected, but did not receive, a station maintenance message from the cable modem is reset to zero, thereby clearing the temporal miscount. In addition, the number of times the CMTS received a station maintenance message from the cable modem is incremented by one. At a step 418 the CMTS determines whether the number of times the CMTS expected, but did not receive, a station maintenance message from the cable modem since the last time the CMTS did receive a station maintenance message from the cable modem is greater than zero. If it is not, control goes to step 316 of FIG. 3. If it is greater than zero, the same number is set to zero at a step 420 since there was a hit. At a step 422, a flap list record is created or updated as was performed at step 410 of FIG. 4a, and the maintenance process continues with step 316 of FIG. 3.

FIG. 4c is a flow diagram of a power adjustment flap detector state machine in accordance with a preferred embodiment of the present invention. It shows in greater detail step 322 of FIG. 3. At step 424 fields relating to power adjustment in the cable modem flap list record are modified. In the described embodiment, the cumulative power adjustment since the last update of the flap list record is incremented by any positive or negative power adjustment commanded by the CMTS to the cable modem. At a step 426 the CMTS determines whether the absolute value of the cumulative power adjustment is greater than a power adjustment threshold. In the described embodiment, a typical threshold value can be 3 dBmV. If the absolute value of the cumulative power adjustment is less than the power adjustment threshold, control returns to step 310 of FIG. 3 where the CMTS issues a station maintenance interval to the cable modem.

At a step 428 the CMTS creates or updates a flap list record corresponding to the cable modem. In the described embodiment, if the cumulative power adjustment exceeds the threshold value on the positive side, it is reduced by the threshold value. If the cumulative power adjustment exceeds the threshold value on the negative end, the threshold value is added. In the described embodiment, step 428 also involves incrementing or setting certain field values in the cable modem table data record, such as incrementing the number of times the cable modem flap list record was updated due to a power adjustment. In addition, the last time the flap list entry was updated is set to the current time, and the number of time the flap list entry was updated is incremented.

Figure 5:
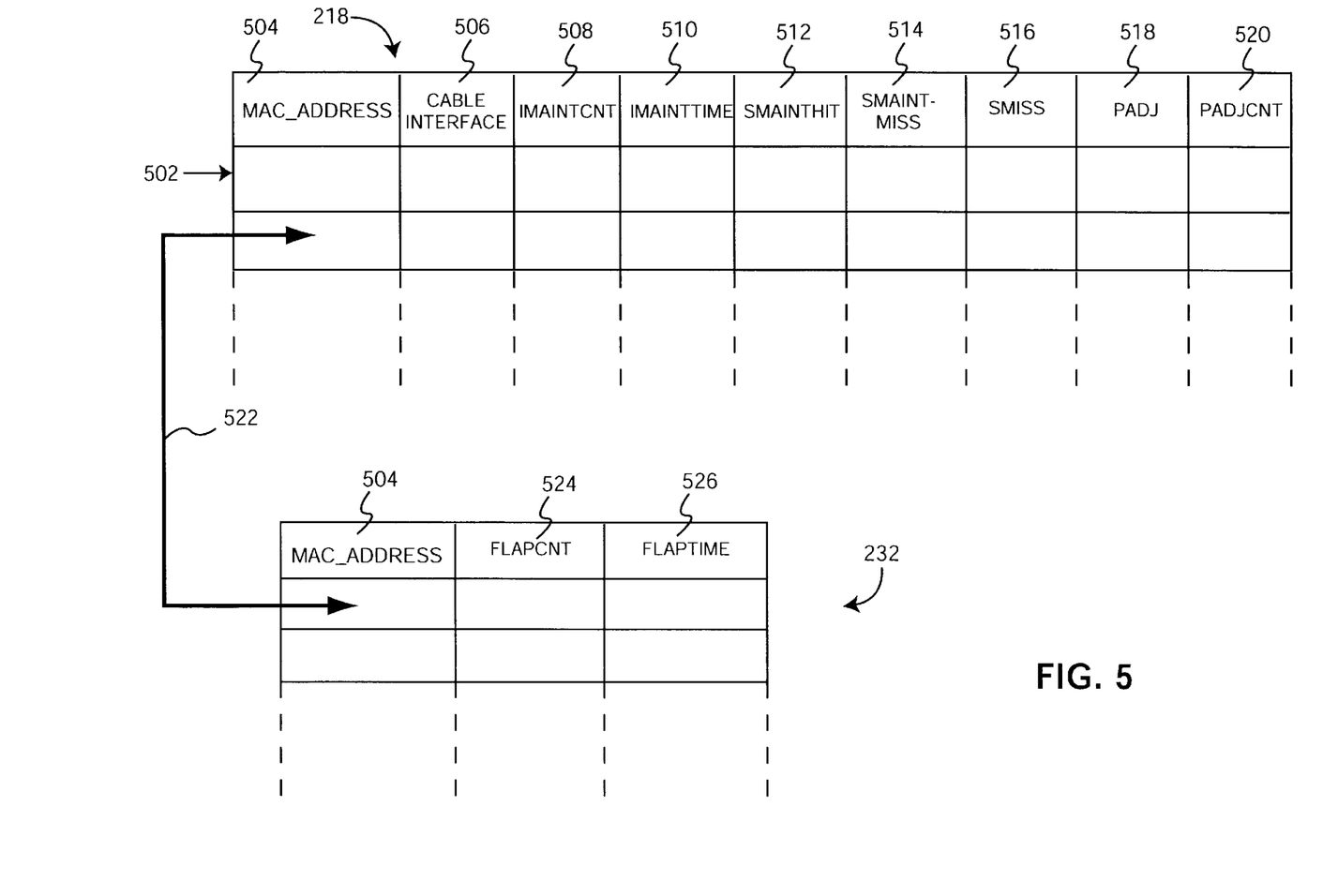
FIG. 5 is a block diagram showing various fields of a cable modem table entry in accordance with a preferred embodiment of the present invention.

FIG. 5 is a block diagram showing various fields of a cable modem table entry 218 in accordance with a preferred embodiment of the present invention. A cable modem table holds statistical data and other information, such as data related to the variables described with respect to the state machines, for each cable modem that is online or linked to the CMTS. Flapping modem list 232 referred to above which contains entries for each flapping modem has references to entries in cable modem table 218. Cable modem table 218 is stored on persistent memory, such as memory 216 of FIG. 2. Each one of the entries, such as entry 502, corresponds to one cable modem.

The flapping modem list contains MAC addresses which, in the described embodiment, act as a reference pointer to a corresponding data record in the cable modem list. In other preferred embodiments, a separate identifier or another field can be used as a reference pointer. Thus, in the described embodiment, one field in cable modem table entry 502 is a MAC address field. This field holds standard format MAC addresses. A cable interface field 506 is used to store an identifier for the cable modem interface, and is also in a standard or proprietary format. This field is used in case the CMTS maintains more than one RF link capable of accepting cable modems. An insertion field 508 holds the number of insertion events that take place in the initial maintenance state machine described in FIG. 4a. This counter is incremented whenever there is an initial maintenance flap. A maintenance time field 510, IMAINTTIME, stores the time an initial maintenance message was received by the CMTS. In the described embodiment, the resolution of field 510 is in seconds.

A cumulative hit field 512, referred to as SMAINTHIT in the described embodiment, is a count of the number of hits encountered by the CMTS. As described above, a hit occurs when the CMTS receives a range request or station maintenance message from a cable modem during that modem's assigned time interval. Similarly, a cumulative miss field 514, shown as SMAINTMISS, is a count of the number of misses experienced by the CMTS from a cable modem. Field 514 stores the number of times the CMTS expected but did not receive a station maintenance message from the cable modem. Fields 512 and 514 are described in greater detail in FIG. 4b showing an Intermittent Upstream Flap Detector state machine. A temporal miss field 516, shown as SMISS, stores the number of times the CMTS expected but did not receive a station maintenance message from the cable modem since the last time cumulative hit field 512 was updated. Thus, temporal miss field 516 is used to store the number of consecutive misses by a cable modem.

A cumulative power adjustment field 518 stores the cumulative power adjustment required of the cable modem since its cable modem flap list record was created or since the flap list record was updated. In the described embodiment it is shown as PADJ and is measured in dBmVs. Following field 518 is a power adjustment count field 520. Shown as PADJCNT in the described embodiment, this field stores the number of times the cable modem flap list record was updated due to a power adjustment. Fields 518 and 520 are described in further detail in FIG. 4c showing a Power Adjustment Flap Detector state machine. In the described embodiment, power adjustment count field 520 is the last field in the cable modem data record. In other preferred embodiments, cable modem data record 502 can have more fields, or can have the fields described above in a different order, without effecting the functionality of the present invention.

Also shown in FIG. 5 is a portion of cable modem flap list 232. As mentioned above, records in flap list 232 and records in cable modem table 218 reference each other using MAC address field 504, shown by arrow 522. In other preferred embodiments, another field that uniquely identifies each cable modem can be used as a link or reference pointer between records in the two tables. Cable modem flap list 232 contains two fields other than MAC address 504: a flap counter field 524 and a flap time field 526. Flap counter field 524, shown as FLAPCNT, is simply a count of the number of times the cable modem flap list record was created or updated. Field 526, shown as FLAPTIME, stores the time the cable modem flap list record was created or last updated. These two fields are described in FIGS. 4b and 4c above. In other preferred embodiments, a cable modem flap list can contain additional fields or have the same fields described herein but ordered differently without effecting the functionality of the present invention.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, the cable modem table and flap list can have additional fields depending on the needs to the cable television plant. In another example, the CMTS can be in a primary hub or in an unmanned secondary hub, and still have the features of the present invention. Accordingly, the present embodiments are to be considered as illustrative and not restrictive, and the invention is not to be limited to the details given herein, but may be modified within the scope and equivalents of the appended claims.

What is claimed is:

1. A system for locating faults in a cable television plant including a plurality of cable modems, the system comprising:
   a network management console for conveying fault information in the cable television plant processed by a fault information processing component;
   a cable modem termination system including a media access control component for preparing data to be transmitted in the cable television plant and for monitoring and tabulating fault data related to the plurality of cable modems, the fault data including
      a miss count for the cable modem which reflects the number of times at least one of the cable modems does not transmit a polling message to the cable modem termination system, and
      one or more additional properties of the at least one of the cable modems, which additional properties include at least a power level adjustment parameter; and
   a memory storage area for storing the fault data associated with the plurality of cable modems.

2. The system of claim 1 wherein the network management console includes a path analyzing module and a display monitor for displaying output from the path analyzing module.

3. The system of claim 1 further comprising a two-way communication link between the network management console and the cable modem termination system.

4. The system of claim 1 wherein the media access control component further comprises a plurality of state machines for detecting transitions of a cable modem.

5. The system of claim 4 wherein one of the state machines in the plurality of state machines detects whether a cable modem is in an initial maintenance state.

6. The system of claim 4 wherein one of the state machines in the plurality of state machines detects whether a cable modem has transmitted a polling message to the cable modem termination system during an assigned time interval.

7. The system of claim 1 wherein the media access control component further comprises a message processing module for sending maintenance messages to the plurality of cable modems and for receiving polling messages from the plurality of cable modems.

8. The system of claim 1 wherein the memory storage area further comprises a flapping modem list having a first plurality of entries and a cable modem table having a second plurality of entries, where an entry in the flapping modem list references an entry in the cable modem table.

9. The system of claim 1 wherein at least one of the plurality of cable modems is configured in conjunction with the cable television plant.

10. A fault locator for use in a cable television plant including a network of cable modems, the fault locator comprising:
    a message processing module for sending and receiving polling messages relating to the network of cable modems;
    a flapping modem detector for detecting when a cable modem changes state more frequently than an acceptable frequency level;
    a memory; and
    a processor associated with the memory;
    wherein at least one of the memory and the processor is configured to store information representing
       a miss count for the cable modem which reflects the number of times at least one of the cable modems does not transmit a polling message to the cable modem termination system,
       one or more additional properties of the at least one of the cable modems, which additional properties include at least a power level adjustment parameter, and
       a flapping modem list relating to the network of cable modems.

11. The fault locator of claim 10 further comprising a network management console for correlating fault information and displaying the fault information to a user.

12. The fault locator of claim 10 wherein the message processing module further comprises a first module for sending an initial maintenance message to the network of cable modems.

13. The fault locator of claim 10 wherein the message processing module further comprises a second module for receiving polling messages from the network of cable modems.

14. The fault locator of claim 10 wherein the flapping modem detector further comprises a hit/miss state machine for detecting whether a cable modem has transmitted a polling message during an allotted time.

15. The fault locator of claim 10 wherein the flapping modem list stores cable modem identifiers and reference pointers to a cable modem table.

16. A system for locating faults in a cable television plant including a plurality of cable modems, the system comprising:
    means for conveying fault information in the cable television plant processed by a fault information processing component;
    means for preparing data to be transmitted in the cable television plant and for monitoring and tabulating fault data related to the plurality of cable modems, the fault data including a miss count for the cable modem which reflects the number of times at least one of the cable modems does not transmit a polling message to the cable modem termination system, and one or more additional properties of the at least one of the cable modems, which additional properties include at least a power level adjustment parameter; and means for storing the fault data associated with the plurality of cable modems.

17. A fault locator for use in a cable television plant including a network of cable modems, the fault locator comprising:

means for sending and receiving polling messages relating to the network of cable modems;

means for detecting when a cable modem changes state more frequently than an acceptable frequency level; and means for storing information representing a miss count for the cable modem which reflects the number of times at least one of the cable modems does not transmit a polling message to the cable modem termination system, one or more additional properties of the at least one of the cable modems, which additional properties include at least a power level adjustment parameter, and a flapping modem list relating to the network of cable modems.

18. A system of locating a faulty component in a cable modem network, the system comprising:

means for determining whether a cable modem has transmitted a polling message to a central destination, the cable modem configured to be in one of a plurality of states, each state representing a condition of the cable modem;

means for creating a miss count for the cable modem, the miss count reflecting the number of times the cable modem does not transmit a polling message to the central repository;

means for creating data specifying one or more additional properties of the cable modem, which additional properties include at least a power level adjustment parameter;

means for tabulating data relating to the miss count, and the one or more additional properties; and means for inserting a cable modem entry in an irregular behavior list according to tabulated data relating to the miss count, and the one or more additional properties.

19. The system of claim 18 wherein means for determining whether a cable modem has transmitted a polling message to a central destination further comprises means for informing the cable modem of a time interval in which the cable modem can transmit a polling message to the central destination.

20. The system of claim 18 wherein the central destination is a cable modem termination system.

21. The system of claim 18 wherein the plurality of states includes a hit state, a miss state, and an initial start-up state.

22. The system of claim 18 further comprising means for informing the central destination that the cable modem is activated and desires a time interval in which to transmit a polling message to the central destination.

23. The system of claim 18 wherein means for creating a miss count for the cable modem further comprises:

means for detecting when the cable modem does not transmit a polling message to the central destination during an assigned time interval; and means for counting the number of times the cable modem does not transmit a polling message to the central repository.

24. The system of claim 23 further comprising means for resetting the miss count to zero whenever the cable modem does transmit a polling message to the central repository.

25. The system of claim 18 further comprising:

means for creating a hit count for the cable modem, the hit count reflecting the number of times the cable modem transmits a polling message to the central repository; and means for resetting the miss count whenever the cable modem transmits a polling message during an assigned time interval.

26. The system of claim 18 wherein means for tabulating data relating to the miss count further comprises means for tracking the number of times the cable modem misses sending a polling message to the central destination.

27. The system of claim 18 wherein means for inserting a cable modem entry in an irregular behavior list of cable modems further comprises means for determining whether the cable modem has behaved in a manner predetermined to be irregular.

28. The system of claim 18 further comprising means for processing the tabulated data from a plurality of cable modems through a path analyzing module to locate a faulty component.

* * * * *